Dec. 11, 1934.  M. BUCHHOLZ  1,984,112
BOLOMETRIC RESISTANCE
Filed Feb. 7, 1930
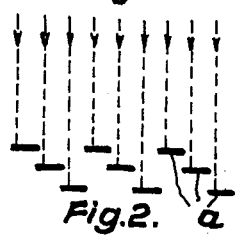
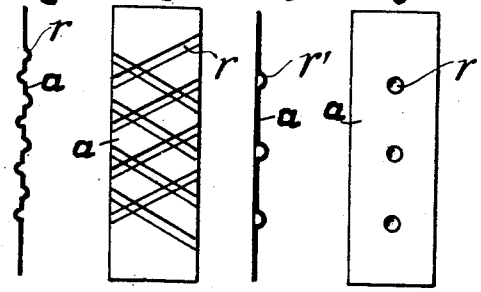
INVENTOR:
Max Buchholz Patented Dec. 11, 1934

1,984,112

UNITED STATES PATENT OFFICE 1,984,112

BOLOMETRIC RESISTANCE

Max Buchholz, Cassel, Germany, assignor to Walter Kidde & Company, Inc., New York, N. Y., a corporation of New York Application February 7, 1930, Serial No. 426,737
In Germany February 13, 1929

2 Claims. (Cl. 201—63)

My invention relates to bolometric resistances and more particularly to bolometric resistances for measuring bridges of such kind which are adapted to measure large energies and to carry large currents.

It is an object of my invention to provide a bolometric resistance which may be used during a large period of time and is not subjected to ageing effects.

In order to attain this result high temperatures should be avoided in all parts of the apparatus. According to my invention this is performed by providing the bolometric resistance with a large receiving surface. This involves the further advantage that the resistance can carry large currents so that relays of large input may be used in connection with the resistance.

It is a further object of my invention to provide a plurality of bolometric resistances electrically connected to each other in series or in parallel and arranged in two or more planes and in spaced relation so that the receiving surfaces of the resistances form a continuous surface, if viewed in the direction of the incoming rays.

It is a further object of my invention to provide means for compensating the influence of deformations of the bolometric resistances.

The increase in temperature produced by the radiation causes deformations of the bolometric resistances which are in turn the causes of faulty results.

According to my invention this drawback is avoided by means which maintain the bolometric resistance substantially in its original form.

It is still another object of my invention to provide means for maintaining substantially equal the operative receiving surface of the bolometric resistances.

In the drawing affixed to this specification and forming part thereof several devices embodying my invention are illustrated diagrammatically by way of example.

In the drawing

Fig. 1 is a diagrammatical cross section of a bolometric resistance comprising a plurality of strips arranged in three planes.

Fig. 2 is a similar cross section of a modified form, the strips being here arranged in two planes.

Fig. 3 is a side view of a single resistance strip stretched by means of a weight.

Fig. 4 is a plan view of a single resistance strip yieldingly supported.

Fig. 5 is an explanatory diagram.

Figs. 6–8 are side views of three single strips according to my invention.

Fig. 9 is a plan view of a further strip.

Figs. 10–13 and 15 are side views of further embodiments of my invention and

Figs. 14 and 16 are plan views of the strips shown in Figs. 13 and 15 respectively, Referring to the drawing and first to Fig. 1 the bolometric resistance comprises several metal strips $a$ electrically connected to each other in series or in parallel. The strips have a large receiving surface so that they are adapted to carry large currents and to take up large radiant energies without being heated to an undesirable temperature. The strips are arranged in three planes and in spaced relations so that each incoming ray will strike a strip. In this manner the strips form a continuous surface, viewed in the direction of the incoming rays.

In a preferred embodiment of my invention the strips form a surface which is substantially equal to the cross section of the incoming beam of rays as shown in Fig. 2 where the strips are arranged in two different planes. In this manner each incoming ray is caught by a strip and the receiving surfaces of the strip are wholly covered by incoming rays.

The radiant energies taken up by the strips cause an increase of temperature and a deformation of the strips. Fig. 5 is a side view of a deformed strip. The strip is deformed in such manner that it is inflected towards the incoming rays. The inflections of the strip cause failures of the measuring result. According to my invention this drawback is avoided by compensating detrimental influences of the deformations. Referring to Fig. 3, one end of the strip $a$ is provided with a loop $u$ laid around a transverse rod $v$, shown in cross section. The other end of the strip $a$ is connected to a wire $w$ laid over a transverse rod $x$. A weight $y$ is connected to the other end of the wire $w$. The weight $y$ stretches the strip $a$ so that its surface remains plane even at higher temperatures. Referring to Fig. 4 this result is obtained by attaching the strip $a$ to the support $b$ by means of rigid holders $f$ and $g$ and to the support $c$ by means of resilient holders $d$ and $e$. The holders $d$ and $e$ are spiral springs which stretch the strip $a$ so that the surface remains plane even at higher temperatures.

In the embodiment shown in Fig. 6 the strip $a$ is connected to the supports $b$ and $c$ by means of spring blades $h$ and $i$. The spring blades $h$ and $i$ have an initial tension of such degree that they are slightly tensioned even at the highest occurring temperatures of the strip $a$.

In the embodiment shown in Fig. 7 the middle portion $k$ of the strip $a$ is formed as a spring. The ends of the strip are rigidly attached to the supports $b$ and $c$.

In the embodiment shown in Fig. 8 the strip $a$ is rigidly attached to the support $b$ and $c$ and $l$ is a spring which tends to draw back the strip when it is inflected towards the incoming rays.

In the embodiment shown in Fig. 9 the strip $a$ is rigidly attached to the support $b$. Connection of the strip $a$ to the other support $c$ is effected by means of a threaded bolt $n$ and a nut $m$. The nut $m$ is screwed onto the bolt $n$ so far that the strip $a$ is stretched to such an extent that it will remain plane-shaped even at the highest occurring temperatures.

If the strip metal is not sufficiently elastic to afford a regulation according to Fig. 9, the strip may be shaped as shown in Figs. 10 and 11.

The embodiments shown in the preceding figures involving the drawback that the connections and soldered joints of the strips to the supports or the springs are subjected to the action of the springs or the stresses exerted on the strips. This drawback is avoided in the device illustrated in Fig. 12. Here the support $b^1$ has an extension $s$ which is formed as a curved blade spring. In this manner the stretching stress to which the strip $a$ is subjected is not transferred to the connection of the strip to the support $b^1$. The support $b^1$ consists of heat-insulating material so that the heat produced in the strip $a$ by the incoming energy is not transferred to the supports.

Figs. 13-16 show several embodiments of my invention for preventing undesirable deformations of the strip $a$. The stiffness of the strip is increased by providing indentations in the receiving surface of the strip.

Figs. 13 and 14 show an embodiment of a strip in side and in plan view. The surface of the strip is here provided with ribs $r$ extending transversely in an inclined direction.

In the embodiment shown in Figs. 15 and 16 the strip is provided with projections $r^1$.

The ends of the strips may be covered against the incoming rays so that the surface stricken by the incoming rays is substantially equal at all temperatures of the strip.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In combination with a bolometer for measuring radiant energy, means positioned in the path of the radiant energy including a plurality of groups of spaced flat strips, each group being disposed in a single plane, the strips of each group succeeding the first group registering with the spaces in the preceding group or groups, thereby covering substantially the greater part of the section of the radiant energy path in which the bolometer is positioned, said means being responsive to radiant energy by a change in the electrical resistance of the strips.

2. In combination with a bolometer for measuring radiant energy, means positioned in the path of the radiant energy comprising a plurality of separated flat strips arranged in successive planes one behind the other, the strips in each plane being staggered with relation to the strips in all other planes, all strips being directly exposed to the radiant energy, said strips thereby covering substantially the greater part of the section of the radiant energy path in which the bolometer is positioned, said means being responsive to radiant energy by a change in the electrical resistance of the strips.

MAX BUCHHOLZ.